US006932162B2

(12) United States Patent
Bureller et al.

(10) Patent No.: US 6,932,162 B2
(45) Date of Patent: Aug. 23, 2005

(54) PNEUMATIC PROCESSING MACHINE HAVING AUTOMATIC STOP AT THE END OF A MACHINING CYCLE

(75) Inventors: Michel Bureller, Antony (FR); Sebastien Pereira Santo, Nogent sur Marne (FR)

(73) Assignee: Recoules S.A., Ozoir la Ferriere (FR)

( * ) Notice: Subject to any disclaimer, the term of this patent is extended or adjusted under 35 U.S.C. 154(b) by 0 days.

(21) Appl. No.: 10/252,676

(22) Filed: Sep. 24, 2002

(65) Prior Publication Data

US 2003/0072627 A1 Apr. 17, 2003

(30) Foreign Application Priority Data

Sep. 25, 2001 (FR) .............................. 01 12336

(51) Int. Cl.[7] .................................. B23Q 5/06
(52) U.S. Cl. ........................ 173/19; 172/13; 172/154
(58) Field of Search .......................... 173/2, 13, 19, 173/154, 169; 74/840

(56) References Cited

U.S. PATENT DOCUMENTS

| 2,791,922 A | * | 5/1957 | Robinson ...................... 173/19 |
| 2,811,877 A | * | 11/1957 | De Groff ..................... 408/130 |
| 2,927,486 A | * | 3/1960 | Robinson et al. ............. 74/841 |
| 2,988,935 A | | 6/1961 | Robinson |
| 3,286,555 A | * | 11/1966 | Klancnik ...................... 408/11 |
| 3,443,646 A | * | 5/1969 | Baker et al. ................. 173/169 |
| 3,512,433 A | * | 5/1970 | Juhasz et al. ................. 408/30 |
| 3,635,605 A | * | 1/1972 | Hall et al. ................... 417/315 |
| 3,833,068 A | * | 9/1974 | Hall ........................... 173/169 |
| 4,258,799 A | * | 3/1981 | Eckman ....................... 173/169 |
| 4,371,297 A | * | 2/1983 | Hirose ......................... 408/130 |
| 4,612,998 A | | 9/1986 | Vindez |
| 4,619,435 A | | 10/1986 | Biek |
| 5,205,540 A | | 4/1993 | Clapp |
| 5,351,797 A | | 10/1994 | Lawson et al. |

FOREIGN PATENT DOCUMENTS

| EP | 1 129 827 A2 | 9/2001 |
| GB | 1 554 169 | 10/1979 |

* cited by examiner

Primary Examiner—Louis K. Huynh
Assistant Examiner—Chukwurah Nathaniel
(74) Attorney, Agent, or Firm—Young & Thompson

(57) ABSTRACT

A pneumatic processing machine includes a pneumatic motor, a circuit for connecting the motor to a source of compressed air, a tool holder spindle, and a drive mechanism. The mechanism includes a selection element which can be moved to select a first method of driving the spindle and a second method of driving the spindle. A device for controlling the operation of the machine controls the carrying-out of a driving cycle which includes at least one phase for driving the spindle according to the first driving method, then a phase for driving the spindle according to the second driving method, then the stopping of the supply of air to the motor. A supply valve of the circuit is controlled mechanically by the selection element to interrupt the supply of compressed air to the motor at the end of the driving cycle.

10 Claims, 4 Drawing Sheets

PNEUMATIC PROCESSING MACHINE HAVING AUTOMATIC STOP AT THE END OF A MACHINING CYCLE

TECHNICAL FIELD

The present invention relates to a processing machine of the type comprising:

a pneumatic motor, a pneumatic circuit for connecting the motor to a source of compressed air, the pneumatic circuit comprising a motor supply valve, a tool holder spindle, a drive mechanism which mechanically connects the motor to the spindle in order to drive it, the mechanism comprising a selection element which can be moved between a first position for selecting a first method of driving the spindle and a second position for selecting a second method of driving the spindle which is different from the first driving method, and a device for controlling the operation of the machine in order to control the carrying-out of a driving cycle which comprises at least one phase for driving the spindle according to the first driving method, then a phase for driving the spindle according to the second driving method, then to control the stopping of the supply of air to the motor.

BACKGROUND TO THE INVENTION

The invention applies in particular to pneumatic drilling machines which are used in aircraft construction.

The first phase of the cycle is generally a phase for advancing and simultaneously rotating the spindle, and the second phase is a phase for retracting and simultaneously rotating the spindle.

The device for controlling the operation of the machine allows the operation of a machine of this type to be stopped automatically once a cycle has been carried out.

In this manner, when a user has installed a plurality of these machines on a support frame and has initiated the operation thereof, the machines stop automatically without any need for specific intervention in respect of any of them.

In this manner, the noise caused by the machines being operated is limited. Furthermore, the pollution produced by the air loaded with lubricant which escapes from the motors of machines of this type is also limited.

In machines of the above-mentioned type, the device for controlling the operation comprises elements of the pneumatic circuit which are dedicated to controlling the closure of the motor supply valve at the end of the retraction phase of the cycle.

It should be noted that the structure of the control device is relatively complex and expensive, in particular because of these dedicated pneumatic elements.

One objective of the invention is to overcome this problem by providing a machine of the above-mentioned type which has a simpler structure and is less expensive.

SUMMARY OF THE INVENTION

To this end, the subject-matter of the invention is a machine of the above-mentioned type which is characterised in that the supply valve is controlled mechanically by the selection element to interrupt the supply of compressed air to the motor at the end of the driving cycle.

According to the individual embodiments, the machine can comprise one or more of the following features, taken in isolation or according to any of the combinations which are technically possible:

the supply valve comprises a shutter which can be displaced mechanically by the selection element between a closed position and at least one open position to allow the passage of compressed air, the shutter can be displaced mechanically by the selection element between a first open position, which the shutter takes up when the selection element is in its first position, and a second open position, which the shutter takes up when the selection element is in its second position, the shutter can be moved by tilting, the shutter is articulated to the selection element, the shutter comprises a displacement rod which is provided with a sphere for articulation to the selection element, since the spindle extends along a spindle axis, the first driving method comprises driving the spindle in translation along the axis thereof in a first direction of advance, and the second driving method comprises driving the spindle in translation along the axis thereof in a second retraction direction which is counter to the first direction, the machine is portable and has a mass of less than 15 kg.

BRIEF DESCRIPTION OF DRAWINGS

The invention will be better understood from a reading of the description below which is given purely by way of example with reference to the appended drawings, in which.

DESCRIPTION OF PREFERRED EMBODIMENT

Figure 1:
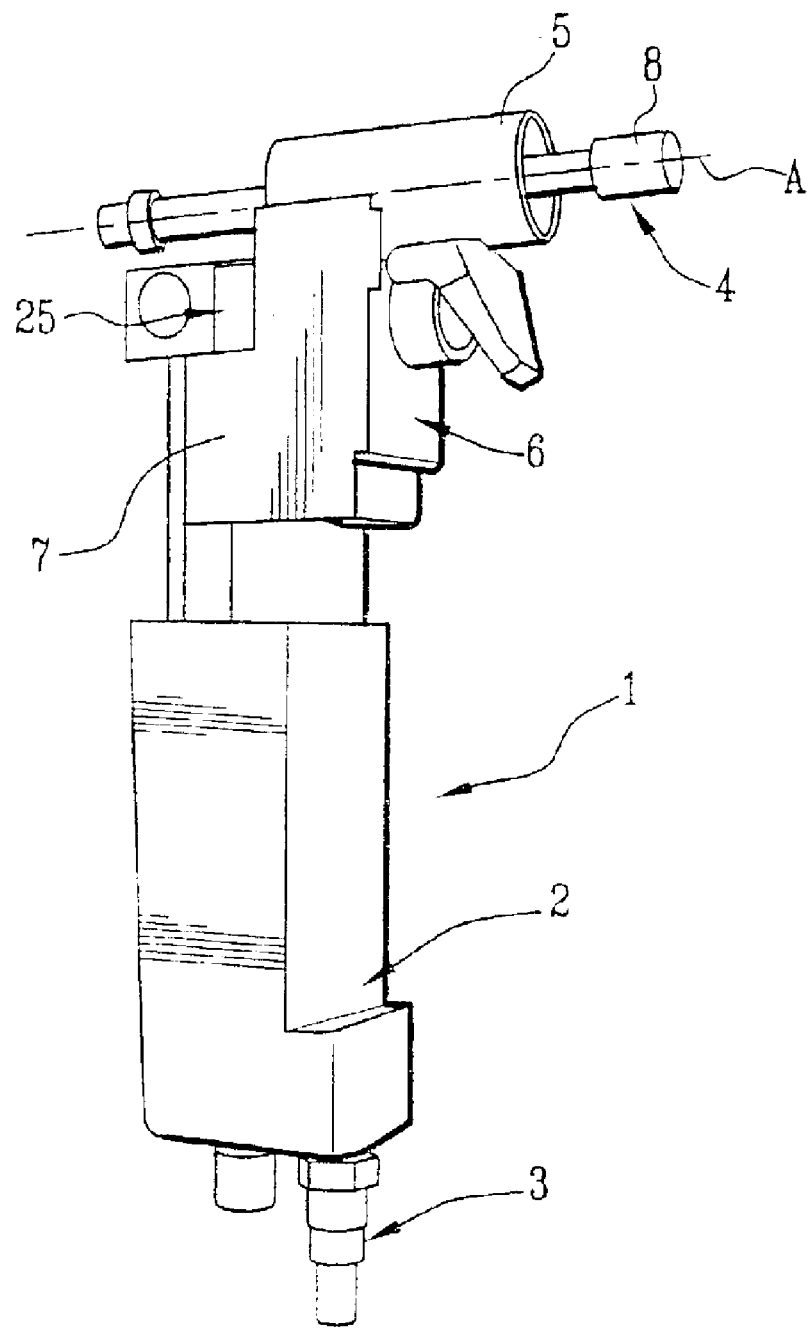
FIG. 1 is a schematic perspective view of a machine according to the invention and FIGS. 2 to 4 are schematic drawings showing the drive mechanism and the device for controlling the operation of the machine in FIG. 1.

FIG. 1 schematically illustrates a portable pneumatic drilling machine 1 which substantially comprises:

a conventional pneumatic motor 2 which is received in a casing, a connector 3 for connection to a source of pressurised air, a tool holder spindle 4 which is received in a casing 5 in order to be movable in rotation along the axis A thereof and in translation along this axis A relative to the casing 5, and a mechanism 6 for driving the spindle 4.

In conventional manner, drilling tools can be mounted in a removable manner at the front end 8 of the spindle 4.

Figure 2:
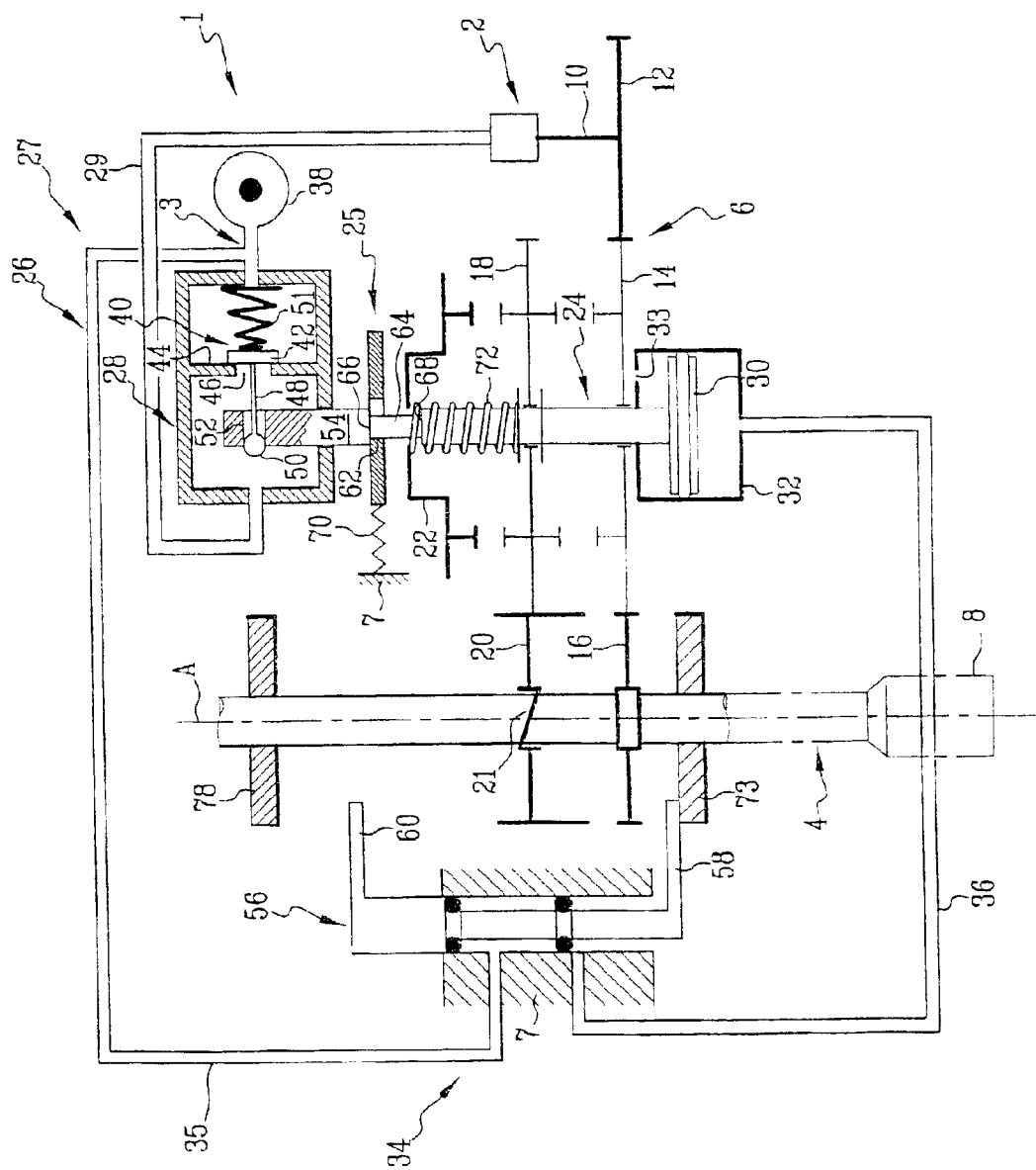
Figure 3:
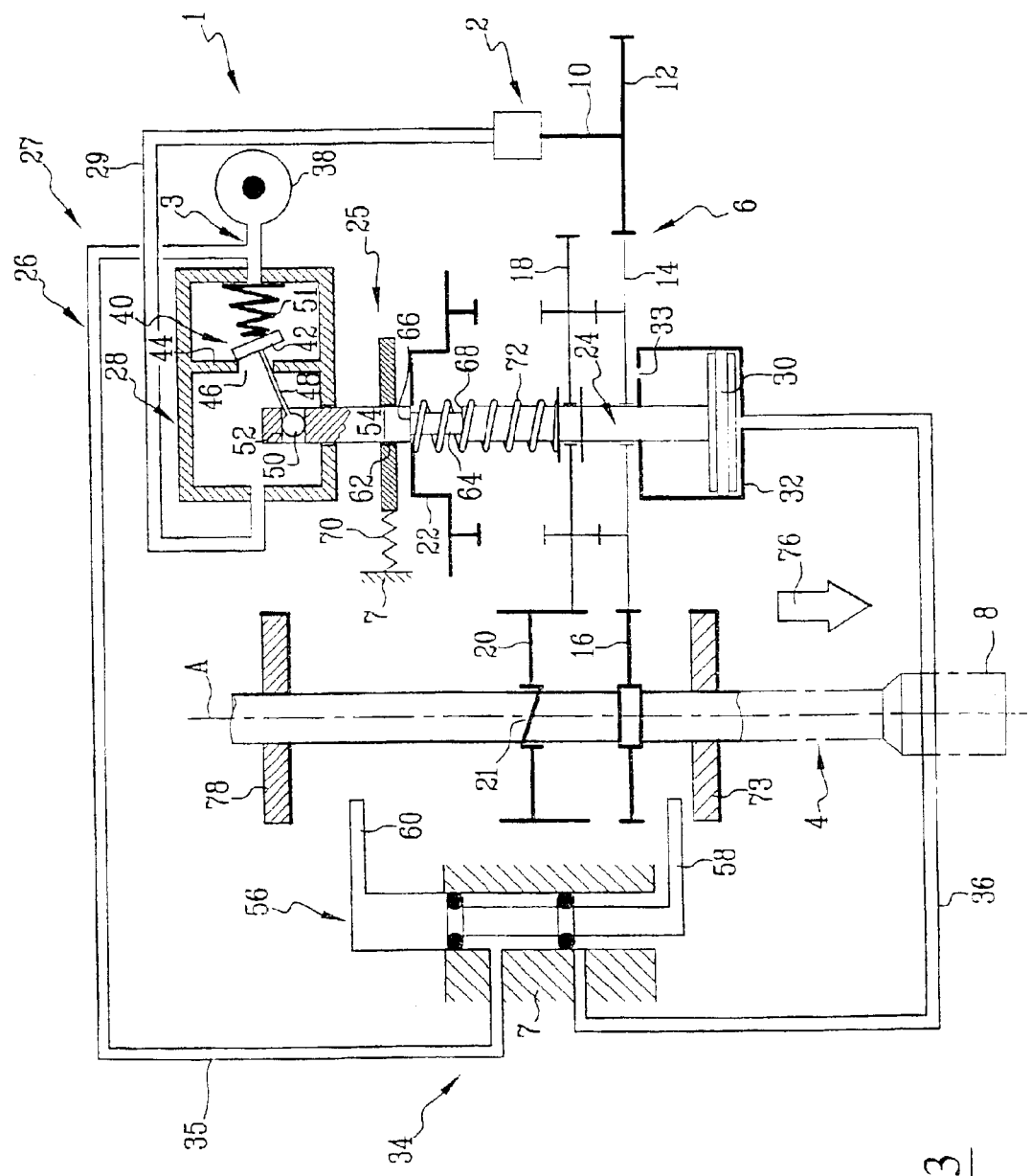
Figure 4:
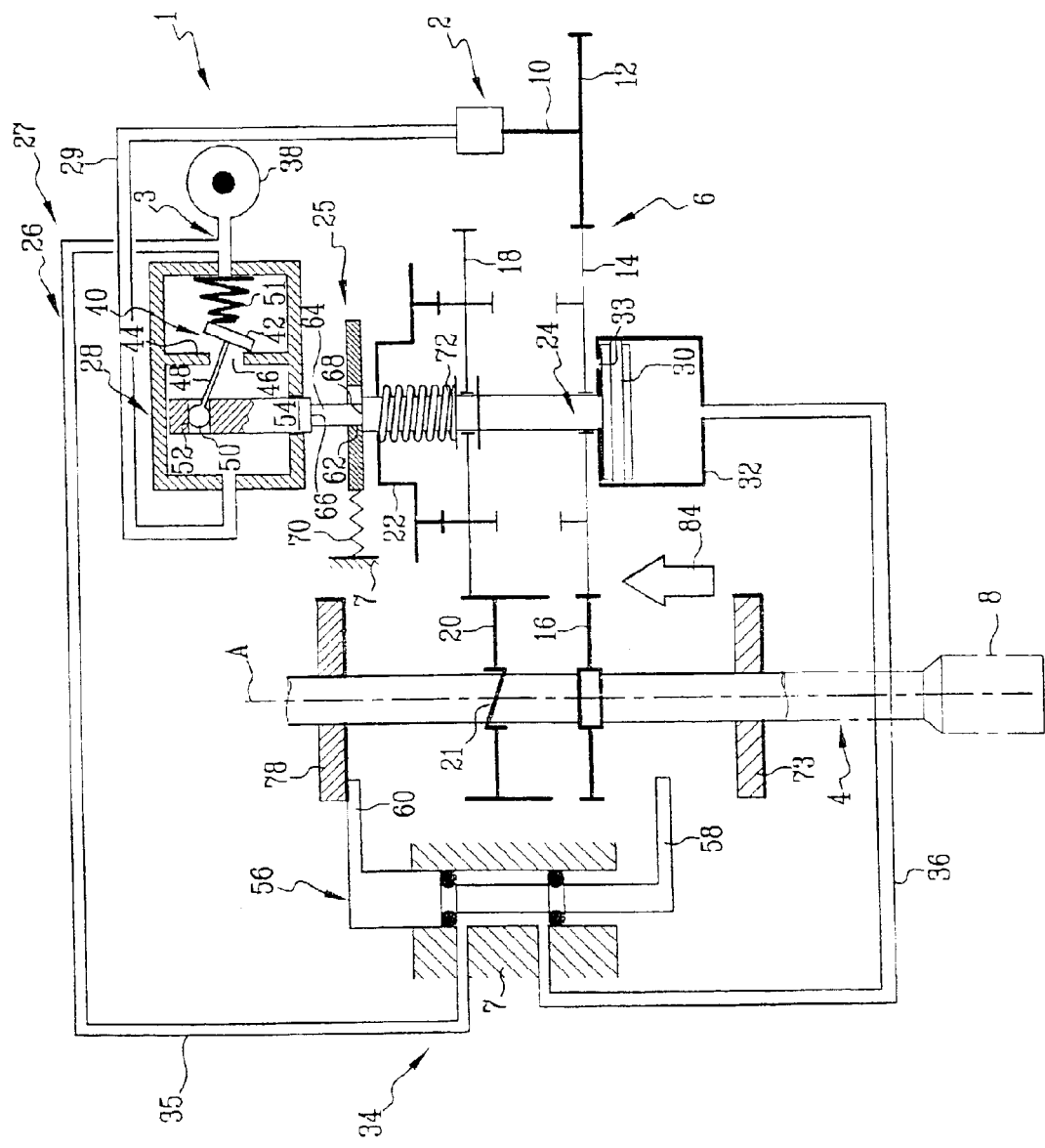

The drive mechanism 6 illustrated by FIGS. 2 to 4 is a conventional mechanism which is generally designated in French as a "mécanisme d'avance mécanique" (mechanical advance mechanism) and, in English, as a "positive feed drill".

In the description below, the terms "lower", "upper", "horizontal", "right" and "left" are intended to relate to FIGS. 2 to 4.

The mechanism 6 substantially comprises:

a gear 12 which is fixed in rotation with the output shaft 10 of the motor 2, a first gear/dog clutch 14 which engages with the gear 12, a gear 16 which engages with the gear/dog clutch 14 and which is fixed in rotation with the spindle 4, the spindle 4 being able to slide along the axis A thereof relative to the gear 16, a second gear/dog clutch 18 located above the first gear/dog clutch 14, a gear 20 which is located above the gear 16, which engages with the gear/dog clutch 18 and which is screwed onto a threaded portion 21 of the spindle 4, a fixed dog clutch 22 which is located above the second gear/dog clutch 18 and, a vertical selection rod 24.

The gears/dog clutches 14 and 18 are mounted to rotate about the rod 24.

The first gear/dog clutch 14 is fixed in translation relative to the casing 7 of the mechanism 6.

The rod 24 can slide vertically in the gear/dog clutch 14 and relative to the casing 7.

The gear/dog clutch 18 is connected in translation to the rod 24 along the vertical axis thereof.

The machine 1 further comprises an actuation element 25 in order to initiate the operation of the machine and a device 26 for controlling the operation thereof. The element 25 is, for example, formed by a button, as illustrated in FIG. 1.

The control device 26 substantially comprises the following elements:

a pneumatic circuit 27 which comprises a valve 28 for supplying the motor 2 with compressed air, which valve 28 is arranged in a duct 29 which extends between the connector 3 and the motor 2, a piston 30 which is provided at the lower end of the rod 24 and which is received in a chamber 32 which comprises an opening 33 for venting in the upper wall thereof, and a pneumatic travel-limit sensor 34.

A duct 35 of the pneumatic circuit 27 is connected, on the one hand, to the duct 29 upstream of the valve 28 and, on the other hand, to the sensor 34. A duct 36 of the circuit 27 connects the sensor 34 to the lower wall of the chamber 32.

It will be appreciated in FIGS. 2 to 4 that a source 38 of compressed air has been illustrated connected to the connector 3.

The valve 28 comprises a shutter 40 which itself comprises a disk 42 which rests on a seat 44, through which an opening 46 extends, and a displacement rod 48 which extends through the opening 46 and which terminates in an articulation sphere 50. A spring 51 biases the disk 42 against the seat 44.

The sphere 50 is received in a horizontal passage 52 which is arranged at the upper end 54 of the rod 24.

The travel-limit sensor 34 comprises a vertical slide 56 which is extended laterally at the lower end thereof by a displacement limb 58 and, at the upper end thereof, by a displacement limb 60.

The actuation element 25 has a passage 62, in which an intermediate portion 64 of reduced diameter of the selection rod 24 is received. This portion 64 is delimited by an upper shoulder 66 and a lower shoulder 68. The portion 64 has a height which is distinctly greater than the thickness of the activation element 25. A spring 70 returns the actuation element 25 to the right in such a manner that it presses on the portion 64 at the bottom of the passage 62.

Furthermore, a spring 72 rests on the dog clutch 22, and therefore on the casing 7, as well as on the gear/dog clutch 18 in order to urge the selection rod 24 in translation downwards.

When the machine 1 is at rest as illustrated in FIG. 2, downward displacement of the selection rod 24 is prevented by the fact that the shoulder 66 is stopped against the actuation element 25.

In FIG. 2, the shutter 40 is in a position closing the opening 46 where it presses, by means of the entire periphery thereof, on the seat 44. The motor 2 is not supplied with pressurised air in this case. The selection rod 24 is in an intermediate rest position or neutral position. The gear/dog clutch 18 is in an intermediate position where it is spaced from the gear/dog clutch 14 and the gear/dog clutch 22. The piston 30 also occupies an intermediate position between the lower wall and upper wall of the chamber 32. The spindle 4 is stationary and takes up a retracted position at the end of its travel path where a lower stop 73, which is integral with the spindle 4, rests against the lower displacement limb 58 of the slide 56.

The slide 56 further isolates the ducts 35 and 36, and therefore isolates the chamber 32 from the source 38. The slide 56 vents the duct 36.

When a user wishes to start carrying out a drilling cycle, he manually displaces the actuation element 25 to the left, compressing the spring 70. This displacement continues until the shoulder 66 no longer rests on the actuation element 25.

The selection rod 24 is then released and biased towards the bottom by the spring 72. This downward movement of the rod 24 continues until the gear/dog clutch 18 is positively engaged with the gear/dog clutch 14 (FIG. 3).

The selection rod 24 is then in a first lowermost position, as is the gear/dog clutch 18.

During this downward movement of the rod 24, the piston 30 is displaced towards the lower wall of the chamber 32. The upper end 54 of the rod 24 is also displaced towards the bottom, causing, by means of the sphere 50 and the rod 48, the shutter 40 of the valve 28 to tilt in a counter-clockwise sense, as illustrated in FIG. 3.

The shutter 40 is then in a first open position where it releases the opening 46 and rests on the seat 44 only by means of an upper portion of the periphery thereof.

The air from the source 38 can then flow through the opening 46 of the seat 44 of the valve 28 and supply the motor 2 via the duct 29. The motor 2 then drives the spindle 4 in rotation about the axis A thereof via the gears 12, 14 and 16.

Since the gears/dog clutches 14 and 18 are positively engaged, they are fixed in rotation. The gear 20 is then driven in rotation by the gear/dog clutch 18. By appropriately selecting the number of teeth of the gears 18 and 20, the gear 20 turns slightly more quickly than the gear 16, as is conventional. Owing to this speed differential, the spindle 4 is driven in translation along the axis A thereof towards the bottom, which corresponds to an advance movement. This movement is schematically indicated by arrow 76 in FIG. 3.

During this advance movement, an upper stop 78 which is integral with the spindle 4 rests on the upper limb 60 of the slide 56. The spindle 4 then drives, during its movement, the slide 56 which slides relative to the casing 7.

When the spindle 4 reaches an advanced travel-limit position (FIG. 4), the slide 56 has been sufficiently displaced to bring the ducts 35 and 36 into communication and to supply the lower region of the chamber 32 with pressurised air. Pressurised air then pushes back the piston 30, and therefore the selection rod 24, towards the top, counter to the restoring force applied by the spring 72.

This upward movement of the rod 24 continues until the piston 30 rests against the upper wall of the chamber 32 (FIG. 4). The rod 24 is then in a second uppermost position, as is the gear/dog clutch 18 which is positively engaged with the dog clutch 22. During this upward movement, the upper end 54 of the rod 24 causes the shutter 40 to tilt in the clockwise sense in FIG. 4 beyond the closed position thereof and as far as a second open position. In the second open position thereof, the shutter 40 releases the opening 46. It then rests on the seat 44 only by means of a lower portion of the periphery thereof.

During this upward movement of the rod 24, the spring 70 pushes back the actuation element 25 to the right until the bottom of the passage 62 again rests against the intermediate portion 64 of the rod 24. At the end of the upward movement of the rod 24, the lower shoulder 68 of the rod 24 rests on the actuation element 25.

Since the gear/dog clutch 18 is positively engaged with the upper gear 22 which is fixed in rotation, the gear/dog clutch 18 and the gear 20 are also fixed in rotation.

Since the gears 14 and 16 themselves continue to turn as described above, the spindle 4 begins a translation movement upwards along the axis A thereof, known as a retraction movement, as illustrated by arrow 84 in FIG. 4.

During this retraction movement, the lower stop 73 of the spindle 4 rests against the lower displacement limb 58 of the slide 56 and thereby causes the slide 56 to be translated upwards relative to the casing 7.

The retraction movement continues until the spindle 4 again takes up its retracted travel-limit position in FIG. 2. The slide 56 again interrupts the communication between the ducts 35 and 36 and vents the duct 36. The piston 30 is no longer subjected to the action of the compressed air and the spring 72 draws back the rod 24 towards the bottom until the shoulder 66 of the shaft 24 rests on the actuation element 25. The selection rod 24 has then taken back up its rest position in FIG. 2 and the shutter 40 its closed position. Therefore, the motor 2 is no longer supplied with compressed air and the operation of the machine 1 is stopped.

In this manner, the machine in FIGS. 1 to 4 has a device 26 for controlling its operation which permits control of the carrying-out of a cycle which comprises a first phase where the spindle is driven simultaneously by a rotation movement and an advance movement, then a second phase where the spindle 4 is driven simultaneously by a retraction movement and a rotation movement, and, at the end of this cycle, the automatic control of the stopping of the machine 1.

The interruption of the supply to the motor 2 at the end of the cycle is ensured owing to a valve 28 which is controlled mechanically by the selection element 24 which is usually present in this type of machine. In this manner, complex pneumatic elements which have been used until now to interrupt the supply to the motor 2 are not necessary.

The structure of the control device 26 is therefore relatively simple and takes up less space.

Furthermore, the cost of the control device 26 is reduced in that it makes use of mechanical control rather than pneumatic control, and also in that this mechanical control is ensured by an element 24 which is generally present in the drive mechanism 6.

Although the above principles have been described in relation to a portable machine, that is to say, having a mass of less than approximately 15 kg, they can apply to a non-portable machine.

Furthermore, they could also apply to a machine dedicated to a type of machining other than drilling.

In this manner, the cycle where the control device 26 ensures the carrying-out can comprise phases which are different from those described above and, in particular, more than two phases where the drive methods are separate.

What is claimed:

1. Processing machine, comprising:
    a pneumatic motor,
    a pneumatic circuit for connecting the motor to a source of compressed air, the pneumatic circuit comprising a motor supply valve,
    a tool holder spindle,
    a drive mechanism which mechanically connects the motor to the spindle in order to drive the spindle, the drive mechanism comprising a selection element which can be moved between a first selection position for selecting a first method of driving the spindle and a second selection position for selecting a second method of driving the spindle which is different from the first driving method, and
    a device for controlling the operation of the machine in order to control the carrying-out of a driving cycle which comprises at least one phase for driving the spindle according to the first driving method, then a phase for driving the spindle according to the second driving method, then to control the stopping of the supply of air to the motor, wherein,
    the supply valve is controlled mechanically by the selection element to interrupt the supply of compressed air to the motor at the end of the driving cycle, and
    the supply valve comprises a shutter which is mechanically movable by the selection element between a first open position, which the shutter takes up when the selection element is in the first selection position, and a second open position, which the shutter takes up when the selection element is in the second selection position.

2. Machine according to claim 1, wherein the shutter is movable by tilting.

3. Machine according to claim 2, wherein the shutter is articulated to the selection element.

4. Machine according to claim 3, wherein the shutter comprises a displacement rod which is provided with a sphere for articulation to the selection element.

5. Machine according to claim 1, wherein since the spindle extends along a spindle axis, the first driving method comprises driving the spindle in translation along the axis thereof in a first direction of advance, and in that the second driving method comprises driving the spindle in translation along the axis thereof in a second retraction direction which is counter to the first direction.

6. Machine according to claim 5, wherein the drive mechanism comprises:
    a first gear/dog clutch,
    a gear for driving the spindle in rotation, which gear engages with the first gear/dog clutch and is fixed in rotation with the spindle, the spindle being able to slide along the axis thereof relative to the first gear,
    a second gear/dog clutch located above the first gear/dog clutch, and
    a gear for driving the spindle in translation, which is located above the gear for driving the spindle in rotation, which engages with the second gear/dog clutch and which is screwed onto a threaded portion of the spindle.

7. Machine according to claim 1, wherein it is portable and has a mass of less than 15 kg.

8. Processing machine, comprising:
    a pneumatic motor;
    a pneumatic circuit connecting the motor to a supply of compressed air, the pneumatic circuit comprising a motor supply valve;
    a tool holder spindle;
    a drive mechanism mechanically connecting the motor to the spindle for driving the spindle,
    the drive mechanism comprising a selection element movable between i) a first selection position for selecting a first spindle driving method and ii) a second selection position for selecting a second spindle driving method, the first and second spindle driving methods being different from each other; and a device for controlling the operation of the machine in order to control execution of a two-phase driving cycle and, after the driving cycle, to control stopping of the supply of air to the motor, the driving cycle comprising a first phase of driving the spindle by the first spindle driving method followed by a second phase of driving the spindle by the second driving method, the supply valve controlled mechanically by the selection element to interrupt the supply of compressed air to the motor at the end of the driving cycle, the supply valve comprising a shutter, mechanically movable by the selection element, between i) a first open position when the selection element is in the first selection position, and ii) a second open position when the selection element is in the second selection position.

9. The machine of claim 8, wherein, the first phase of driving the spindle comprises advancing and simultaneously rotating the spindle, and the second phase of driving the spindle comprises retracting and simultaneously rotating the spindle.

10. The machine of claim 9, wherein, the device for controlling the operation of the machine automatically stops the spindle once the two-phase driving cycle has been carried out.

* * * * *